Patented Jan. 17, 1928.

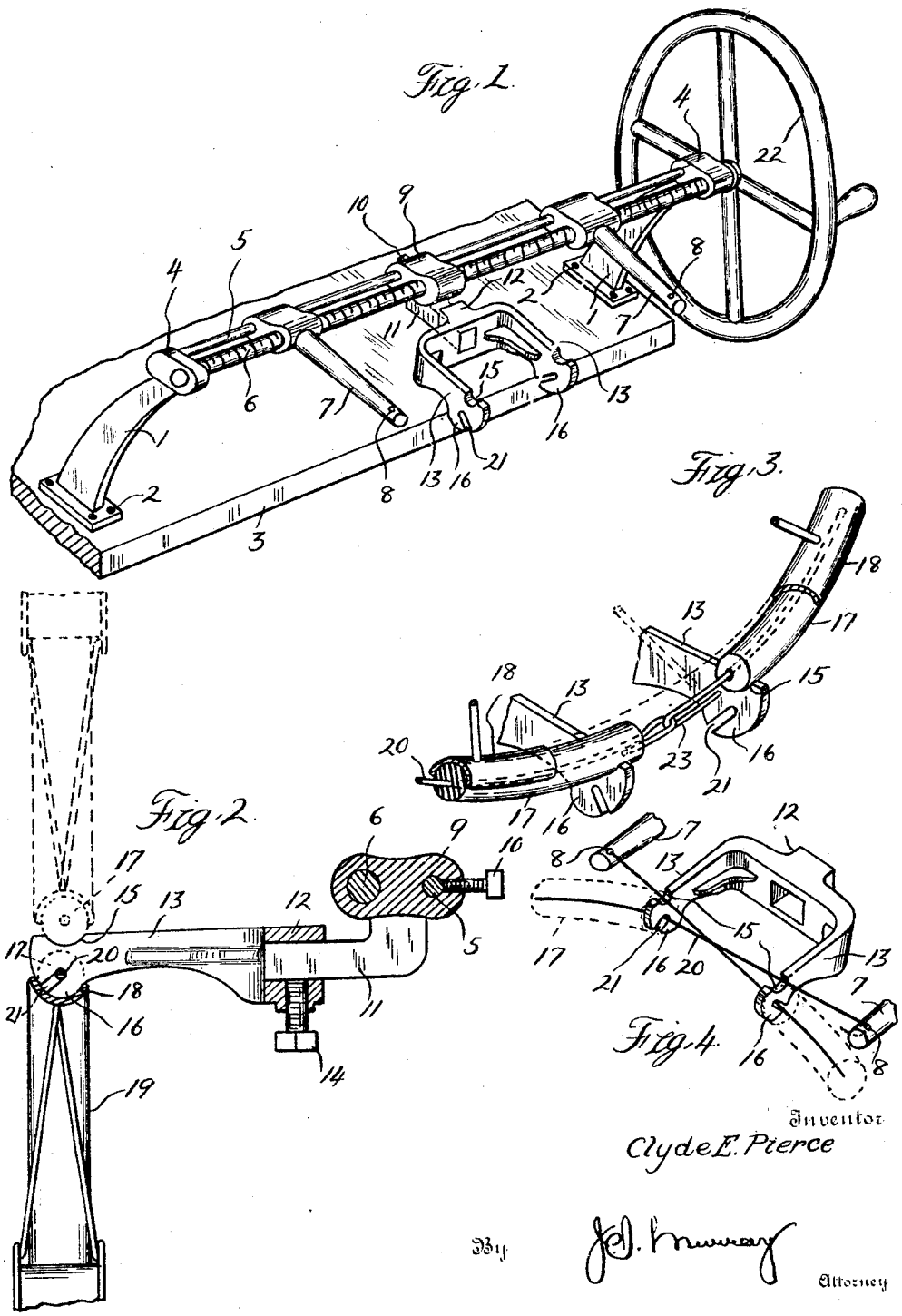

1,656,606

UNITED STATES PATENT OFFICE.

CLYDE E. PIERCE, OF DETROIT, MICHIGAN.

TIRE-SETTING MACHINE.

Application filed March 16, 1925. Serial No. 15,842.

This invention relates to tire setting machines and methods of tire setting, and particularly relates to machines and methods for mounting upon the wheels of small vehicles, such as baby carriages and vehicular toys, tires provided with tie wires, and adapted to be held upon said wheels by fastening together the ends of the wires.

It is an object of the invention to provide a machine and a method for establishing the necessary connection between the extremities of the tie wire of a tire, such as will draw the tire into a firm and lasting engagement with a wheel, without putting upon the wire such torsional stresses as will unduly detract from the strength of the wire.

A further object is to establish the desired connection by such a machine and such a method as will accomplish a considerable saving of time, as compared to present practices.

Another object is to provide a machine for the purpose above specified, having certain parts interchangeable, so that wheels of different diameters may be with equal facility equipped with tires by said machine, and so that tires of various thicknesses may equally well be applied to wheels by said machine.

Still another object is to provide a spacer member for use upon a tire setting machine for holding apart the tire extremities while a tie is being established between the end portions of a wire carried by the tire, said member engaging the wire in such a manner as to permit a ready disengagement responsive to a turning of the wheel about a diametral axis thereof for the purpose of connecting the end portions of said wire.

These and various other objects the invention attains by the construction hereinafter described, and illustrated in the accompanying drawing, wherein:

Figure 1 is a perspective view of the improved machine.

Figure 2 is a cross section view of the same, showing the initial position of the wheel in full lines and its final position in dash lines.

Figure 3 is a perspective view of the wheel in its final position, showing the established connection between the end portions of the tie wire.

Figure 4 is a perspective view showing how the tie wire of a tire to be applied by the improved machine is adapted to engage the forked member which forms a spacer for the tire extremities and to likewise engage tensioning arms, one at each side of said forked member.

In these views the reference character 1 designates a pair of spaced standards, secured by screws 2 or other suitable means to a work bench or table, adjacent to an edge 3 of the latter.

The upper ends of said standards are similarly integrally formed with integral heads 4 which mount the ends of a rod 5 and which further journal the extremities of a feed screw 6, spaced slightly forward from said rod. 7 designates a pair of arms which are carried jointly by the rod 5 and screw 6 and which project forwardly from the latter. Said arms have a free sliding engagement with the rod 5, and are engaged by reversely threaded portions of the screw 6. Through the forward ends of the arms 7 bores 8 extend, preferably in a vertical direction.

Said rod and screw carry, substantially midway of their length a double collar 9, clamped fast upon said rod by a set screw 10 or the like. Said collar engages the screw 6 between the reversely threaded portions of the latter, there being an unthreaded portion of said screw between said portions for entering said collar.

A rectangular shank 11, integrally projecting forwardly from the collar 9 forms a support detachably engageable by a spacer member, consisting of a sleeve 12 adapted to fit upon said shank and a pair of substantially parallel spaced forks or arms 13, forwardly projecting from said sleeve. Preferably said arms are offset downwardly to some extent from the plane of the arms 7, for a purpose hereinafter explained. Said spacer member is adapted to be releasably secured upon the shank 11 by a set screw 14 carried by the sleeve 12 or by some other suitable means. At their forward ends, the arms 13 are correspondingly formed with notches 15 in their upper edges, and below said notches substantially semicircular lugs 16 project downwardly from said arms. Said lugs are adapted to engage and hold apart the extremities of a tire 17, formed preferably of rubber, which is being engaged within the grooved rim 18 of a wheel 19 by the described machine. A tie wire 20 passing freely through said tire has its end portions projecting from the tire extremities, and the lugs 16 are slotted, as indicated at 21, to accommodate said end portions. To facilitate the connecting of said end portions, as will present be described, the slot 21 of one of said lugs enters the latter in rearward direction and that in the other lug enters in a forward direction, both slots being upwardly inclined from their open ends.

For rotating the screw 6 a hand wheel 22 is mounted fast upon one end of said screw.

In the use of the described machine, after a length of tire 17 proportioned to properly embrace the rim 18 has been engaged by a tie wire 20 of somewhat greater length than will eventually be used, said tire is wrapped upon said rim and the wheel 19 is then disposed vertically beneath the arms 13, in a transverse relation to the latter, with the lugs 16 entering the groove of said rim and engaging the extremities of the tire to maintain a gap between said extremities. Each projecting end portion of the tie wire is passed through the slot 21 of the adjacent lug 16 and the two end portions are then crossed between the arms 13 and are oppositely extended over said arms and through the notches 15 of the latter, being finally engaged with the outer ends of the arms 7. Said wire may be very quickly secured to the arms 7 by inserting its ends in the bores 8 and then winding the end portions of the wire once around said arms.

By means of the hand wheel 22, the operator now rotates the screw 6 in a direction to feed the arms 7 apart. This is continued until the wire 20 is placed under such stress as to secure the tire firmly upon the rim. The operator now grasps the wheel 19 and turns it about a diametral axis substantially intersecting the point of crossing of the end portions of the wire through one hundred and eighty degrees, with the result that interengaged return bends 23 are formed by said end portions. The direction of this turning is such that the wire, at its points of passage through the slots 21 moves oppositely forward and back toward the open ends of said slots, and consequently freely disengages from both thereof, owing to their relatively reversed form.

Preferably, while the wheel is being turned as described about a diametral axis, it is at the same time bodily rotated about an axis substantially established by the stressed end portions of the wire, thus shifting said wheel from its initial position beneath the arms 13, to a final position above said arms, as is indicated in dash lines in Fig. 2. In this final position, the operator has more convenient access to the return bends 23, in cutting off the lengths of wire leading to the arms 7, these lengths now being superfluous. The connection as it appears after this cutting operation is clearly shown in Fig. 3. It is further desirable to swing the wheel to a position above the arms 13, while it is at the same time being turned about a diametral axis, in order to have the tire clear of the lugs 16 in the final position of the wheel. That is to say, the tire is under a circumferential compression when it has been drawn tight upon the wheel with its extremities held apart by the arms 13 of the spacer, and as soon as the diametral turning of the wheel disengages said extremities from said arms, the relieving of said compression advances the tire extremities some distance toward each other, and the tire then forms an obstacle to positioning of the wheel again beneath the arms 13. The process of setting the tire is completed by forcing its end portions toward each other through pressure applied in any desired manner until the gap between said portions is completely closed.

It is to be noted that the described connection between the tie wire extremities does not torsionally strain the wire and consequently said connection is much less likely to break under stress than connections formed by intertwisting the end portions of the wire. When the end portions of the tire have been slipped over the return bends of the wire, the latter are held against unbending, so that the connection is a secure one.

The detachable mounting of the spacer 12, 13 upon the shank 11 is an important feature of the described construction, inasmuch as the spaced relation of the arms 13 and the size of the lugs 16 must be suited to the diameter of the wheel and to the thickness of the tire to be set on said wheel. Thus the machine may be provided with a set of such spacers, differing as to the spacing of said arms and the size of said lugs and for any certain job a spacer especially suited therefor will be employed.

What I claim is:

1. In a machine for mounting upon a wheel a tire provided with a tie wire, a pair of tire tightening elements engageable by crossed end portions of the wire projecting from the tire extremities, a common means for shifting said elements to and from each other, and a spacer for the tire extremities disposed substantially between said pair of elements and fixed with respect to travel thereof, said spacer having a pair of spaced projections for engagement by the tire extremities, and said projections having slots to accommodate the tie wire, said slots oppositely entering the two projections.

2. In a machine for mounting upon a wheel a tire provided with a tie wire, a pair of tire tightening elements engageable by crossed end portions of the wire propecting from the tire extremities, a common means for shifting said elements to and from each other, and a spacer for the tire extremities disposed substantially between said pair of elements and fixed with respect to the travel thereof, said spacer comprising a pair of substantially parallel spaced arms having corresponding projections for engaging the tire extremities, slotted to accommodate the tie wire, the slots of said projections extending substantially lengthwise of said arms, and entering the two projections oppositely.

3. The method of mounting upon a wheel a tire provided with a tie wire, consisting in wrapping the tire upon the wheel rim with end portions of said wire projecting from the tire extremities, engaging said extremities with a spacer to form a gap between said extremities, crossing the wire end portions within said gap and oppositely stressing said portions, turning the wheel relative to said stressed end portions about an axis diametral to the wheel and substantially intersecting the point of crossing of said end portions, thereby forming said end portions with interengaged return bends, and at the same time turning said wheel bodily about an axis established substantially by said end portions and thereby shifting said wheel from a position beneath to one above said spacer, cutting off the surplus material from said end portions, and closing the gap between the tire extremities and at the same time entering said return bends in the tire.

In testimony whereof I sign this specification.

CLYDE E. PIERCE.